United States Patent [19]

Yang et al.

[11] Patent Number: 5,208,000
[45] Date of Patent: May 4, 1993

[54] HYDROLYSIS OF PHOSPHORUS TRICHLORIDE

[75] Inventors: Chen-Hsyong Yang; David O. Fisher, both of Chesterfield, Mo.

[73] Assignee: Monsanto Company, St. Louis, Mo.

[21] Appl. No.: 955,590

[22] Filed: Oct. 2, 1992

[51] Int. Cl.$^5$ .......................................... C01B 25/163
[52] U.S. Cl. ..................................... 423/316; 423/317; 423/481
[58] Field of Search ........................ 423/316, 317, 481

[56] References Cited

U.S. PATENT DOCUMENTS

| | | | |
|---|---|---|---|
| 1,147,183 | 7/1915 | Peacock | 423/316 |
| 2,595,198 | 4/1952 | Lefforge et al. | 423/316 |
| 2,595,199 | 4/1952 | Lefforge et al. | 423/316 |
| 2,670,274 | 2/1954 | Jones | 423/317 |
| 2,684,286 | 7/1954 | Krieger | 423/316 |
| 3,415,624 | 12/1968 | Cremer et al. | 423/316 |
| 3,937,616 | 2/1976 | Cremer et al. | 423/316 |
| 4,834,960 | 5/1989 | Grosse et al. | 423/317 |
| 5,147,625 | 9/1992 | Tapper et al. | 423/316 |

FOREIGN PATENT DOCUMENTS

| | | | |
|---|---|---|---|
| 54-16957 | 6/1979 | Japan . | |
| 2242900 | 10/1991 | United Kingdom | 423/316 |

OTHER PUBLICATIONS

Schumann, Rudolph; Rapid Method for Determining Elemental Phosphorus Trichloride; Chem. Tech. (Leipzig) vol. 24, No. 6, p. 363 (1972).

Kirievaskaya et al; Gas—Chromatographic Determination of White Phosphorus and of Certain Phosphorus Chloride; Zhurnal Prickladnoi Khimmi, vol. 45, No. 9, pp. 2074-2076 (1972).

Gantner et al; Applications of Laser Raman Spectrometry in Process Control Central Using Optical Fibers; Fresenius J. Anal Chem. vol. 338 pp. 2-8 (1990).

Keeler, R. A. et al; Analysis of Mixtures of White Phosphorus, Phosphorus Oxychloride and Phosphorus Trichloride; Anal Chem. vol. 26, No. 5, pp. 933-934.

Primary Examiner—Wayne Langel
Attorney, Agent, or Firm—R. C. Loyer

[57] ABSTRACT

There is disclosed a process for the controlled hydrolysis of phosphorus trichloride which avoids the formation of lower oxides of phosphorus, phophines and diphosphines wherein phosphorus pentachloride is added to the phosphorus trichloride from about 20 to about 90 percent by weight of the phosphorus trichloride and then water in the form of finely divided droplets is added over the surface of the phosphorus trichloride while the temperature is controlled to below about 80° C.

10 Claims, No Drawings

HYDROLYSIS OF PHOSPHORUS TRICHLORIDE

This invention relates to a process for the hydrolysis of phosphorus trichloride and more particularly a process for the hydrolysis of said compound so as to avoid the formation of highly reactive compounds.

BACKGROUND OF THE INVENTION

There occurs in industry the need to quickly and efficiently hydrolyze residual amounts of phosphorus trichloride contained in reactors, storage tanks and shipping containers such as tank cars, etc. In one such instance, the reactors employed to produce phosphorus trichloride by the reaction of chlorine and elemental phosphorus must be periodically cleaned out because they accumulate foreign material. After carefully completing the reaction so as to consume the available elemental phosphorus, the reactor is usually opened and water is introduced to hydrolyze the remaining phosphorus trichloride that cannot be removed from the reactor. The usual practice is to carefully flush the reactor or tank with water thereby hydrolyzing the residual phosphorus trichloride to phosphorous acid. It is well known that fires and explosions have occurred while conducting such operations because of the inadvertent formation of highly reactive compounds other than the intended phosphorous acid. Furthermore, vapors may form in the runaway reaction resulting in overloading the scrubber system and allowing pollutants to be emitted into the air.

In studies of the hydrolysis reaction whereby water is added to phosphorus trichloride, it has been noted that the reaction is highly exothermic and that the heat generated by the reaction increases the rate of reaction for the remaining amount of available water. Water droplets have been observed to remain cohesive in a body of phosphorus trichloride until the exothermic reaction heated the local area of the droplet allowing a greatly increased reaction rate thereby further increasing the temperature of the phosphorus trichloride. Because there is some delay in achieving total reaction of the added water in the phosphorus trichloride, excess water may have been added before it is realized that a runaway reaction will occur. As the temperature of the hydrolysis reaction increases it has been found that more highly reactive species such as the lower oxides of phosphorus, phosphines and diphosphines are formed which induce uncontrollable reactions with available water giving rise to the possibility of fire or explosion.

There is therefore needed a safe yet efficient means to economically flush residual phosphorus trichloride from vessels such as storage tanks, shipping containers and particularly reactors which must be regularly cleansed of foreign matter.

SUMMARY OF THE INVENTION

In accordance with the present invention there is provided a safe, efficient process for the hydrolysis of phosphorus trichloride which avoids the formation of (substantial amounts) of lower oxides of phosphorus, phosphines and diphosphines comprising adding phosphorus pentachloride to the phosphorus trichloride in an amount in the range of from about 20 to about 90 percent, by weight of the phosphorus trichloride, and then adding water in the form of finely divided droplets over the surface of the phosphorus trichloride while controlling the temperature of the mixture below about 80° C.

DETAILED DESCRIPTION OF THE INVENTION

In one aspect of this invention there is provided a safe, economical method for cleaning the heel residue from a reactor employed to produce phosphorus trichloride from elemental phosphorus and chlorine. In allowed copending application Ser. No. 07/807,353 filed Dec. 13, 1991, there is described novel means for operating a reactor wherein phosphorus trichloride is produced by the reaction of elemental phosphorus and chlorine. The reaction must be interrupted periodically to clean out foreign matter that collects in the reactor. In said copending application there is explained a process whereby the residual phosphorus is carefully consumed by reaction with chlorine. There is then left in the reactor a heel comprising phosphorus trichloride which must be hydrolyzed before the remaining contents can be removed for disposal.

In accordance with this invention there is added to the reactor or any vessel containing phosphorus trichloride an amount of phosphorus pentachloride which, at ambient temperature is normally solid, in the range of from about 20 to 90 percent of the weight of phosphorus trichloride. Preferably, there is provided a saturated solution whereby solid phosphorus pentachloride is present. Therefore, it is preferred that amounts of phosphorus pentachloride substantially in excess of 36 percent to about 80 percent are added prior to the introductions of water. Amounts of phosphorus pentachloride in excess of 90 percent based upon the weight of phosphorus trichloride may be added but would not be of further benefit to the hydrolysis process.

With phosphorus pentachloride present in the phosphorus trichloride, water is introduced by means of a spray nozzle which provides finely divided droplets of water over the surface of the phosphorus trichloride. Because phosphorus pentachloride reacts instantaneously with water the initial reaction upon addition of water produces phosphoric acid according to the following equation:

$$PCl_5 + 4 H_2O \text{ --- } H_3PO_4 + 5 HCl$$

While the above reaction proceeds with each drop of water coming into contact with phosphorus pentachloride the hydrolysis of phosphorus trichloride takes place but with the added environment of phosphoric acid. The hydrolysis of phosphorus trichloride takes place according to the following equation:

$$PCl_3 + 3 H_2O \text{ --- } H_3PO_3 + 3 HCl$$

In both reactions the hydrogen chloride is given off as a gas and is collected or scrubbed from the system. In addition, a small amount of phosphorus trichloride is also vaporized due to the heat of the hydrolysis reaction. This also is collected or scrubbed from the system.

In the most preferred embodiment of this invention water is sprayed in finely divided droplets from a spray nozzle positioned near the surface of the phosphorus trichloride such that the entire surface is sprayed uniformly. As the hydrolysis proceeds the reaction mass is desirably agitated such as with a nitrogen purge so as to achieve uniform reaction throughout the mixture. By positioning the spray nozzle near the surface of the phosphorus trichloride there is avoided the carrying out of water from the reactor by the venting gases.

The term "finely divided" as employed herein with respect to droplets of water means water droplets ranging up to about 150 microns in mean volume diameter and generally in the range of from about 20 to about 60 microns in mean diameters. Suitable water droplets are achieved through the use commonly available spray nozzles such as Models 7G, 7N, 1/8J, & 1/4J manufactured by Spraying Systems Company, Wheaton, Ill. The spray nozzle preferably has a cone pattern to reach the full area of phosphorus trichloride to be hydrolyzed.

In general, the amount of water added to phosphorus trichloride residues such as the phosphorus trichloride reactor mentioned above is at least stoichiometric, allowing sufficient water in addition for the hydrolysis of at least a portion of the phosphorus pentachloride. Water is added with continuous cooling to maintain the temperature of the reaction mass below about 80° C. at all times. The temperature profile of the reaction is readily appreciated in that with water addition the temperature of the reaction mass has a tendency to increase. Water addition is continued until the temperature profile changes such that addition of water no longer causes a tendency for the reaction mass to increase in temperature. In fact, when hydrolysis of the phosphorus trichloride is complete, further addition of water will cause a decrease in the temperature of the reaction mass. At such indication the process for hydrolysis of phosphorus trichloride is considered complete. In most instances, the hydrolyzed product is flushed to waste for proper disposal.

The foregoing description illustrates selected embodiments of the present invention and in light thereof variations and modifications will be suggested to one skilled in the art, all of which are in the spirit of this invention.

What is claimed is:

1. A process for the controlled hydrolysis of phosphorus trichloride which avoids the formation of lower oxides of phosphorus, phosphines and diphosphines comprising adding phosphorus pentachloride to the phosphorus trichloride in an amount in the range of from about 20 to about 90 percent, by weight of the phosphorus trichloride, to provide a mixture of phosphorus pentachloride and liquid phosphorus trichloride, and then adding water in the form of finely divided droplets over the surface of the phosphorus trichloride while controlling the temperature of the mixture below about 80° C.

2. The process of claim 1 wherein the temperature is controlled in the range of from about 30° to about 60° C.

3. The process of claim 1 wherein the amount of phosphorus pentachloride is sufficient to at least saturate the phosphorus trichloride.

4. The process of claim 1 wherein the water droplets are up to about 150 microns in mean volume diameter.

5. The process of claim 1 wherein the phosphorus trichloride is contained in a heel of a reactor in which phosphorus trichloride is produced by the reaction of elemental phosphorus and chlorine.

6. The process of claim 5 wherein the heel is agitated during the hydrolysis reaction.

7. The process of claim 6 wherein nitrogen gas is employed to agitate the mixture.

8. The process of claim 5 wherein phosphorus trichloride is evaporated and collected overhead during hydrolysis.

9. The process of claim 1 wherein the water is provided by means of a spray nozzle above the surface of the phosphorus trichloride.

10. The process of claim 9 wherein the nozzle provides a cone shaped spray pattern over the surface of the phosphorus trichloride.

* * * * *